United States Patent
Mucignat et al.

(10) Patent No.: US 9,495,005 B2
(45) Date of Patent: *Nov. 15, 2016

(54) SYSTEMS AND METHODS FOR PROCESSING MOTION SENSOR GENERATED DATA

(71) Applicant: Apple Inc., Cupertino, CA (US)

(72) Inventors: Andrea Mucignat, Burlingame, CA (US); Bryan J. James, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 298 days.

This patent is subject to a terminal disclaimer.

(21) Appl. No.: 14/081,431

(22) Filed: Nov. 15, 2013

(65) Prior Publication Data

US 2014/0071046 A1    Mar. 13, 2014

Related U.S. Application Data

(63) Continuation of application No. 12/186,313, filed on Aug. 5, 2008, now Pat. No. 8,587,515.

(51) Int. Cl.
*G06F 3/01* (2006.01)
*G06F 1/16* (2006.01)
(Continued)

(52) U.S. Cl.
CPC ............... *G06F 3/01* (2013.01); *G06F 1/1626* (2013.01); *G06F 1/1694* (2013.01); *G06F 3/038* (2013.01); *G06F 3/0346* (2013.01); *G06F 2200/1637* (2013.01)

(58) Field of Classification Search
CPC ........................................................ G06F 3/01
See application file for complete search history.

(56) References Cited

U.S. PATENT DOCUMENTS 5,471,405 A    11/1995    Marsh
6,013,007 A    1/2000    Root et al.
(Continued)

FOREIGN PATENT DOCUMENTS

KR    1999-0073234    10/1999
WO    02/093272    11/2002

OTHER PUBLICATIONS

Ericsson Inc. "Cellular Phone With Integrated MP3 Player." Research Disclosure Journal Number41815, Research Disclosue Database No. 418015 (Feb. 1999).

(Continued)

*Primary Examiner* — Amare Mengistu
*Assistant Examiner* — Shawna Stepp Jones
(74) *Attorney, Agent, or Firm* — Van Court & Aldridge LLP

(57) ABSTRACT

Systems and methods for processing data from a motion sensor to detect intentional movements of a device are provided. An electronic device having a motion sensor may process motion sensor data along one or more dimensions to generate an acceleration value representative of the movement of the electronic device. The electronic device may then determine whether the acceleration value changes from less than a low threshold, to more than a high threshold, and again to less than the low threshold within a particular amount of time, reflecting an intentional movement of the electronic device by the user. In response to determining that the acceleration value is associated with an intentional movement of the electronic device, the electronic device may perform a particular event or operation. For example, in response to detecting that an electronic device has been shaken, the electronic device may shuffle a media playlist.

27 Claims, 5 Drawing Sheets

(51) Int. Cl.
    *G06F 3/0346*    (2013.01)
    *G06F 3/038*     (2013.01)

(56)         References Cited

U.S. PATENT DOCUMENTS

| | | |
|---|---|---|
| 6,032,108 A | 2/2000 | Seiple et al. |
| 6,135,951 A | 10/2000 | Richardson et al. |
| 6,357,147 B1 | 3/2002 | Darley et al. |
| 6,463,385 B1 | 10/2002 | Fry |
| 6,539,336 B1 | 3/2003 | Vock et al. |
| 6,560,903 B1 | 5/2003 | Darley |
| 6,582,342 B2 | 6/2003 | Kaufman |
| 6,619,835 B2 | 9/2003 | Kita |
| 6,716,139 B1 | 4/2004 | Hosseinzadeh-Dolkhani et al. |
| 6,790,178 B1 | 9/2004 | Mault et al. |
| 6,793,607 B2 | 9/2004 | Neil |
| 6,898,550 B1 | 5/2005 | Blackadar et al. |
| 7,030,735 B2 | 4/2006 | Chen |
| 7,062,225 B2 | 6/2006 | White |
| 7,171,331 B2 | 1/2007 | Vock et al. |
| 7,174,227 B2 | 2/2007 | Kobayashi et al. |
| 7,200,517 B2 | 4/2007 | Darley et al. |
| 7,251,454 B2 | 7/2007 | White |
| 7,278,966 B2 | 10/2007 | Hjelt et al. |
| 7,292,867 B2 | 11/2007 | Werner et al. |
| 7,454,002 B1 | 11/2008 | Gardner et al. |
| 7,519,327 B2 | 4/2009 | White |
| 7,618,345 B2 | 11/2009 | Corbalis et al. |
| 7,670,263 B2 | 3/2010 | Ellis et al. |
| 8,587,515 B2 * | 11/2013 | Mucignat et al. ............ 345/156 |
| 2002/0077784 A1 | 6/2002 | Vock et al. |
| 2003/0097878 A1 | 5/2003 | Farringdon et al. |
| 2005/0172311 A1 | 8/2005 | Hjelt et al. |
| 2005/0212760 A1 * | 9/2005 | Marvit et al. ................ 345/156 |
| 2006/0026521 A1 | 2/2006 | Hotelling et al. |
| 2006/0026535 A1 | 2/2006 | Hotelling et al. |
| 2007/0075965 A1 | 4/2007 | Huppi et al. |

OTHER PUBLICATIONS

Menta "1200 Song MP3 Portable is a Milestone Player." http://www.mp3newswire.nel/stories/personaljuke.html. Jan. 11, 2000 (retrieved Jul. 17, 2010).

Creative Nomad® Digital Audio Player User Guide, Jun. 1999.

Creative Nomad® II Getting Started Guide, 1999.

Rio 500 Getting Started Guide, 1999.

Rio PMP300 User's Guide, 1998.

* cited by examiner

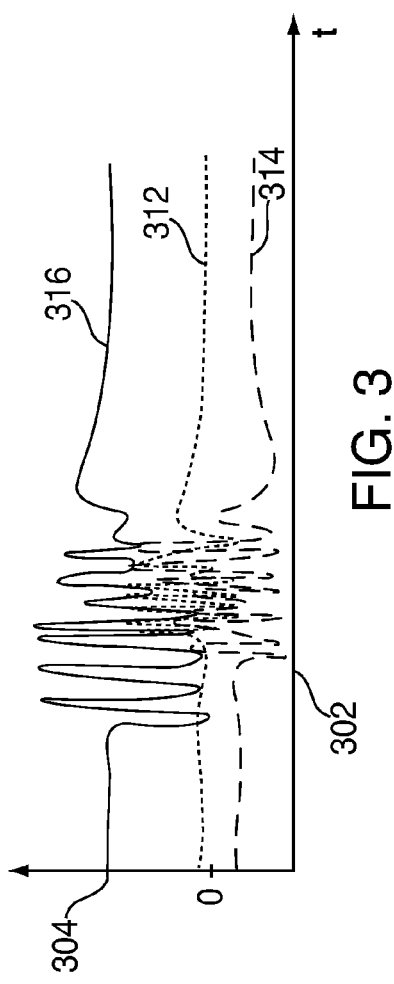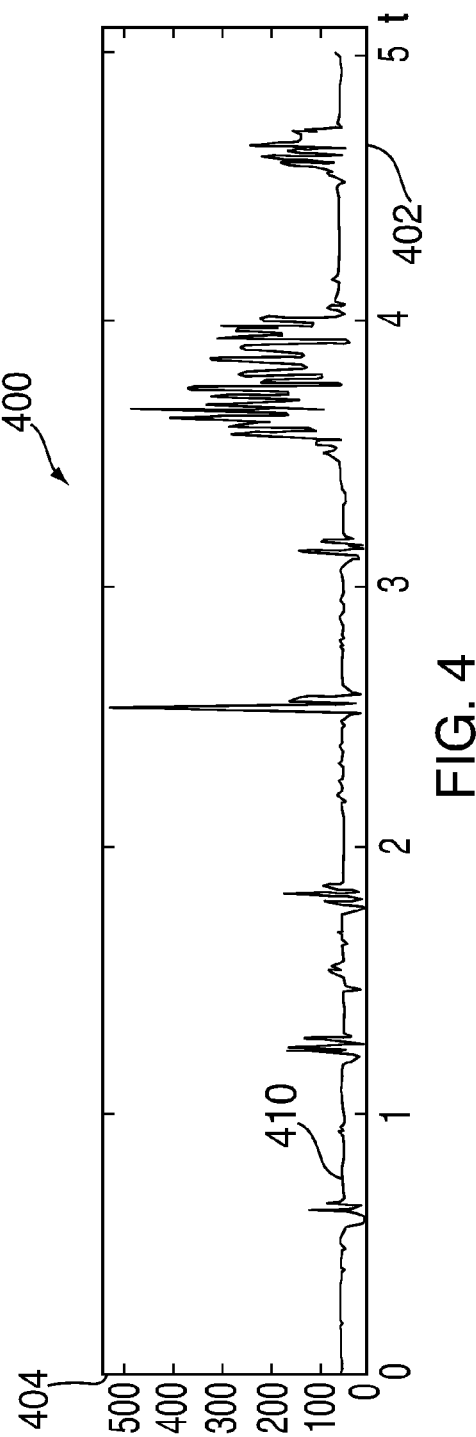

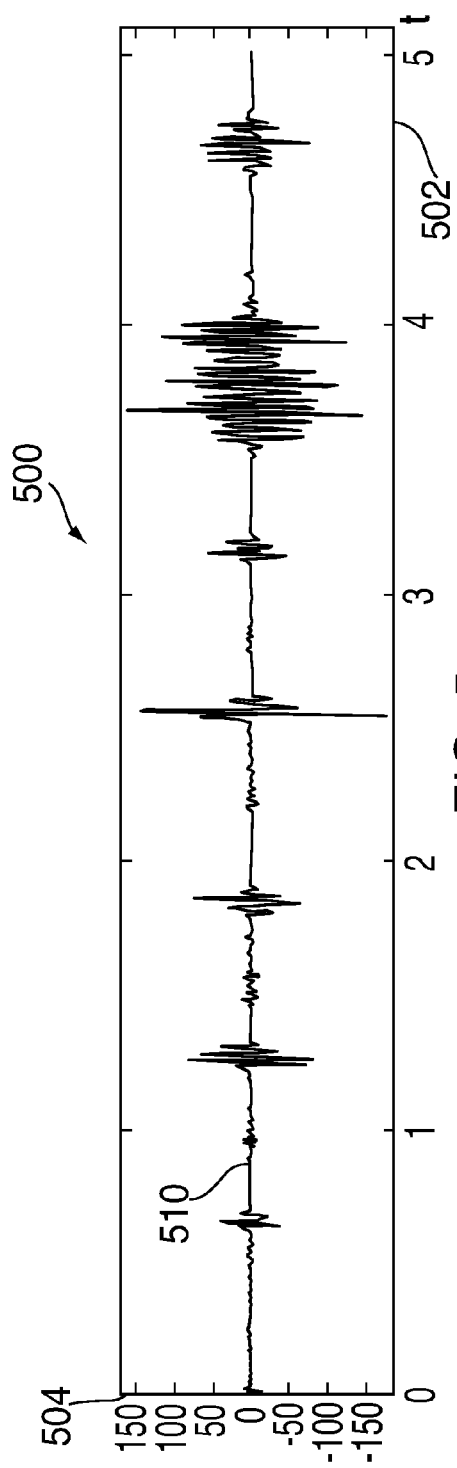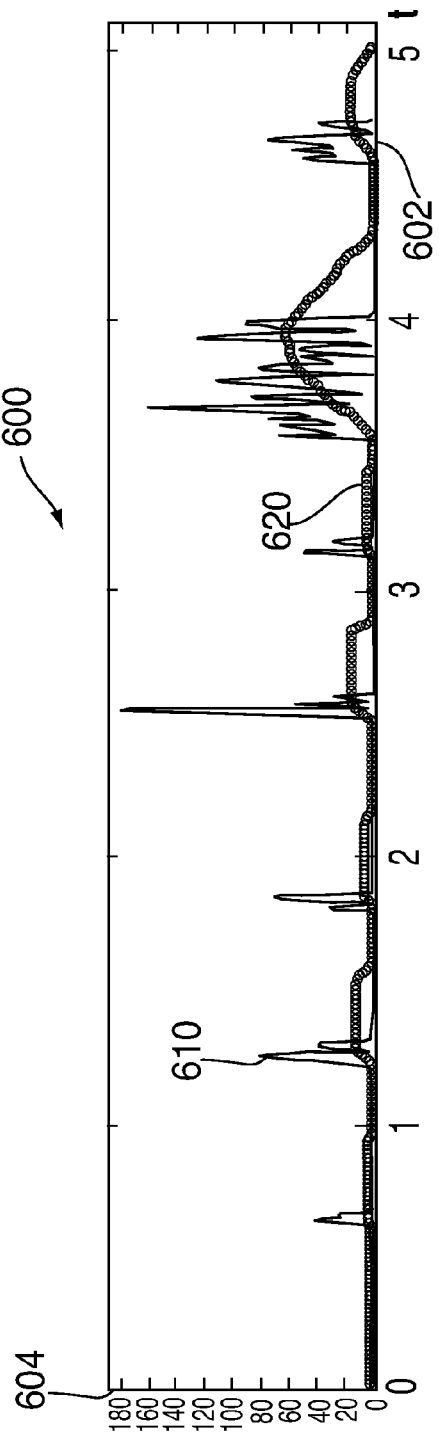

SYSTEMS AND METHODS FOR PROCESSING MOTION SENSOR GENERATED DATA

CROSS-REFERANCE TO RELATED APPLICATIONS

This application is a continuation of the U.S. patent application Ser. No. 12/186,313 filed Aug. 5, 2008 (now U.S. Pat. No. 8,587,515), which is incorporated by reference herein in its entirety.

BACKGROUND OF THE INVENTION

Electronic devices, and in particular portable media devices may include several input mechanisms for users to access or control device functions or operations. For example, some electronic devices may include keys or buttons that a user may press to provide an input (e.g., keys from a keyboard, or a selection button). As another example, some electronic devices may include touch-sensitive surfaces operative to detect inputs provided by a user (e.g., a capacitive touch screen or touch pad, or a pressure pad).

In some embodiments, electronic devices may include one or more sensors for detecting characteristics of the electronic device or of the surroundings of the electronic device. For example, an electronic device may include a GPS or other location detection sensor operative to detect the location of the electronic device. As another example, an electronic device may include an accelerometer, gyroscope, or other motion sensor or motion sensing component operative to detect the orientation of the electronic device. The electronic device may be operative to automatically perform particular operations based on sensor outputs reflecting the position or orientation of the device (e.g., switch a display to portrait or landscape mode, or provide an indication of resources available in the vicinity of the user).

SUMMARY OF THE INVENTION

System, methods and computer-readable media for detecting intentional movements of an electronic device and associating an electronic device event with a detected movement are provided.

In some embodiments, the electronic device may identify the output of a motion sensor of the device and process the output to generate an acceleration value. The electronic device may track the variations of the acceleration value over time and determine, by tracking, whether the acceleration value sequentially changes from less than a predefined low threshold, to more than a predefined high threshold, and again to less than the low threshold. In some embodiments, one or more timing constraints may be applied to the variations of the acceleration value. For example, the acceleration value may be more than the high threshold for a minimum time, and change from more than the high threshold to less than the low threshold in less than a maximum time. As another example, the change in value from less than the low threshold to more than the high threshold and back to less than the low threshold may be less than a master time.

In some embodiments, the electronic device may detect a motion of an electronic device from the output of a motion sensor and process the output to generate an acceleration value associated with the operation. In response to determining that the acceleration value becomes less than a predefined low threshold, more than a predefined high threshold, and again less than the low threshold, the electronic device may perform a particular operation associated with the detected motion. In some embodiments, the electronic device may associate at least one of the process for determining the acceleration value and the values of each threshold to different electronic device operations associated with electronic device movements. The process and threshold values selected may be associated with particular distinguishable electronic device movements to ensure that the proper electronic device operation is performed in response to detecting a device motion.

In some embodiments, a motion sensor of an electronic device may provide an output related to the motion of the device. A processor of the electronic device may process the motion sensor output and determine whether the motion sensor output satisfies a rule associated with intentional movements of the electronic device. If the processor determines that the rule is satisfied, the processor may generate an event. The rule may include, for example, determining that an acceleration value determined from the motion sensor output is higher or lower than particular thresholds, and moves to different values within particular time constraints.

BRIEF DESCRIPTION OF THE DRAWINGS

The various embodiments of the invention are set forth in the following detailed description, taken in conjunction with the accompanying drawings, in which like reference characters refer to like parts throughout, and in which:

FIG. 3 is a schematic view of an illustrative graph of accelerometer output over time in accordance with one embodiment of the invention;

FIG. 4 is a schematic view of an illustrative graph of the magnitude of the acceleration in accordance with one embodiment of the invention;

FIG. 5 is a schematic view of an illustrative graph of the magnitude of acceleration after eliminating the effect of gravity in accordance with one embodiment of the invention;

FIG. 6 is a schematic view of an illustrative graph of the rectified magnitude of acceleration after eliminating the effect of gravity in accordance with one embodiment of the invention;

DETAILED DESCRIPTION

An electronic device having a motion sensor is provided. The motion sensor may include, for example, an accelerometer operative to detect movements of the electronic device in two or three dimensions.

To enhance a user's experience using the electronic device, the electronic device may enable the user to control particular operations or generate specific events by moving the electronic device. For example, a user may control media playback operations (e.g., shuffling media) by moving the electronic device. The electronic device may distinguish arbitrary movements of the device from intentional movements by a user intending to generate an event or perform an operation using the output of the motion sensor. To reduce false positives, by which the electronic device mistakenly believes that a particular movement of the device was intended by the user to perform an operative when in fact the movement was arbitrary, the electronic device may process the output of the motion sensor.

The motion sensor may provide several outputs (e.g., at least one output per axis or dimension detected by the sensor). The electronic device may process the outputs to generate a single output (e.g., an acceleration value) representative of the electronic device motion. For example, the electronic device may calculate the magnitude of the sensor output (e.g., the length of a detected acceleration vector). To remove the effects of gravity from the single output, the electronic device may apply a high pass filter to remove the DC component of the output. The resulting AC component may be rectified and filtered using a low pass filter to provide a moving average of the acceleration detected by the device. The resulting processed acceleration value may provide a substantially smooth reflection of the amount of movement of the electronic device.

The electronic device may determine whether the processed acceleration value is associated with an intentional device movement using any suitable approach. In some embodiments, the electronic device may determine whether the acceleration value, starting under a low threshold, rises above a high threshold before falling back below the low threshold. To further reduce false positives, the electronic device may determine whether the change in acceleration value occurs within one or more time periods. For example, the electronic device may determine whether different variations of the processed acceleration value occur within different time constraints (e.g., the entire variation occurs within a timeout period, or the acceleration value exceeds the high threshold for a particular duration). In some embodiments, the variations of the acceleration value may be associated with different states of the electronic device such that the device must sequentially pass through particular states to generate an event or perform an operation based on data received from the motion sensor.

Figure 1:
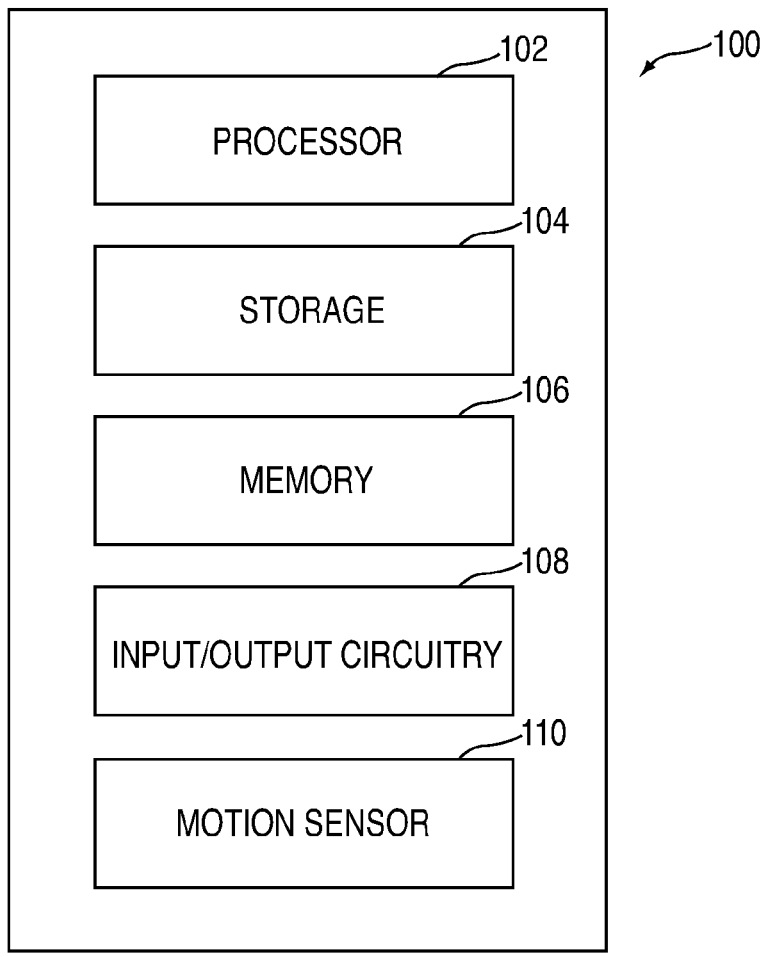
FIG. 1 is a schematic view of an illustrative electronic device for detecting user inputs using a motion sensor in accordance with one embodiment of the invention.

FIG. 1 is a schematic view of an illustrative electronic device for detecting user inputs using a motion sensor in accordance with one embodiment of the invention. Electronic device 100 may include processor 102, storage 104, memory 106, input/output circuitry 108, and motion sensor 110. In some embodiments, one or more of electronic device components 100 may be combined or omitted (e.g., combine storage 104 and memory 106). In some embodiments, electronic device 100 may include other components not combined or included in those shown in FIG. 1 (e.g., communications circuitry, a power supply, a display, bus, or input mechanism), or several instances of the components shown in FIG. 1. For the sake of simplicity, only one of each of the components is shown in FIG. 1.

Processor 102 may include any processing circuitry operative to control the operations and performance of electronic device 100. For example, processor 100 may be used to run operating system applications, firmware applications, media playback applications, media editing applications, or any other application. In some embodiments, a processor may drive a display and process inputs received from a user interface.

Storage 104 may include, for example, one or more storage mediums including a hard-drive, solid state drive, flash memory, permanent memory such as ROM, any other suitable type of storage component, or any combination thereof. Storage 104 may store, for example, media data (e.g., music and video files), application data (e.g., for implementing functions on device 100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that may enable electronic device 100 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 106 can include cache memory, semi-permanent memory such as RAM, and/or one or more different types of memory used for temporarily storing data. In some embodiments, memory 106 can also be used for storing data used to operate electronic device applications, or any other type of data that may be stored in storage 104. In some embodiments, memory 106 and storage 104 may be combined as a single storage medium.

Input/output circuitry 108 may be operative to convert (and encode/decode, if necessary) analog signals and other signals into digital data. In some embodiments, input/output circuitry 108 can also convert digital data into any other type of signal, and vice-versa. For example, input/output circuitry 108 may receive and convert physical contact inputs (e.g., from a multi-touch screen), physical movements (e.g., from a mouse or sensor), analog audio signals (e.g., from a microphone), or any other input. The digital data can be provided to and received from processor 102, storage 104, memory 106, or any other component of electronic device 100. Although input/output circuitry 108 is illustrated in FIG. 1 as a single component of electronic device 100, several instances of input/output circuitry can be included in electronic device 100.

Electronic device 100 may include any suitable mechanism or component for allowing a user to provide inputs to input/output circuitry 108. For example, electronic device 100 may include any suitable input mechanism, such as for example, a button, keypad, dial, a click wheel, or a touch screen. In some embodiments, electronic device 100 may include a capacitive sensing mechanism, or a multi-touch capacitive sensing mechanism. Some sensing mechanisms are described in commonly owned Hotelling et al. U.S. Published Patent Application No. 2006/0026521, filed Jul. 30, 2004, entitled "Gestures for Touch Sensitive Input Device," and Hotelling et al. U.S. Published Patent Application No. 2006/0026535, filed Jan. 18, 2005, entitled "Mode-Based Graphical User Interfaces for Touch Sensitive Input Device," both of which are incorporated herein in their entirety.

In some embodiments, electronic device 100 can include specialized output circuitry associated with output devices such as, for example, one or more audio outputs. The audio output may include one or more speakers (e.g., mono or stereo speakers) built into electronic device 100, or an audio component that is remotely coupled to electronic device 100 (e.g., a headset, headphones or earbuds that may be coupled to communications device with a wire or wirelessly).

In some embodiments, I/O circuitry 108 may include display circuitry (e.g., a screen or projection system) for providing a display visible to the user. For example, the display circuitry may include a screen (e.g., an LCD screen) that is incorporated in electronics device 100. As another example, the display circuitry may include a movable display or a projecting system for providing a display of content on a surface remote from electronic device 100 (e.g., a video projector). In some embodiments, the display circuitry can include a coder/decoder (Codec) to convert digital media data into analog signals. For example, the display circuitry (or other appropriate circuitry within electronic device 100) may include video Codecs, audio Codecs, or any other suitable type of Codec.

The display circuitry also can include display driver circuitry, circuitry for driving display drivers, or both. The display circuitry may be operative to display content (e.g., media playback information, application screens for applications implemented on the electronic device, information regarding ongoing communications operations, information regarding incoming communications requests, or device operation screens) under the direction of processor 102.

Motion sensor 110 may include any suitable motion sensor operative to detect movements of electronic device 100. For example, motion sensor 110 may be operative to detect a user's movements of electronic device 100. In some embodiments, motion sensor 110 may include one or more three-axes acceleration motion sensors (e.g., an accelerometer) operative to detect linear acceleration in three directions (i.e., the x or left/right direction, the y or up/down direction, and the z or forward/backward direction). As another example, motion sensor 110 may include one or more two-axis acceleration motion sensors which may be operative to detect linear acceleration only along each of x or left/right and y or up/down directions (or any other pair of directions). In some embodiments, motion sensor 110 may include an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer.

In some embodiments, motion sensor 110 may be operative to directly detect rotation, rotational movement, angular displacement, tilt, position, orientation, motion along a non-linear (e.g., arcuate) path, or any other non-linear motions. For example, if motion sensor 110 is a linear motion sensor, additional processing may be used to indirectly detect some or all of the non-linear motions. For example, by comparing the linear output of motion sensor 110 with a gravity vector (i.e., a static acceleration), motion sensor 110 may be operative to calculate the tilt of electronic device 100 with respect to the y-axis. In some embodiments, motion sensor 110 may instead or in addition include one or more gyro-motion sensors or gyroscopes for detecting rotational movement. For example, motion sensor 110 may include a rotating or vibrating element.

In some embodiments, the electronic device may include communications circuitry for communicating with other devices or with one or more servers using any suitable communications protocol. Electronic device 100 may include one more instances of communications circuitry for simultaneously performing several communications operations using different communications networks. For example, communications circuitry may support Wi-Fi (e.g., a 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof.

In some embodiments, electronic device 100 may include a bus operative to provide a data transfer path for transferring data to, from, or between control processor 102, storage 104, memory 106, input/output circuitry 108, sensor 110, and any other component included in the electronic device.

To enhance a user's experience interacting with the electronic device, the electronic device may provide the user with an opportunity to provide inputs by moving (e.g., shaking) the electronic device. In particular, the electronic device may detect inputs provided by a user moving the electronic device based on the output of the motion sensor of the device. For example, the motion sensor may provide an output associated with particular movement of the device and cause the electronic device to perform an operation or generate an event in response to detecting the motion sensor output. The detected movement may include, for example, movement along one or more particular axes of the motion sensor (e.g., a tilting motion detected in a z-y plane, or a shaking motion detected by along any of the accelerometer axes).

The electronic device may perform any suitable operation or generate any suitable event in response to detecting a particular motion. For example, in response to detecting a shaking motion, the electronic device may shuffle a media playlist, skip to a previous or next media item (e.g., music), change the volume of played back media, pause or play media, change a playlist attribute (e.g., toggle a shuffle or looping feature, for example on and off), or perform any other suitable operation. In some embodiments, the electronic device may allow a user to navigate menus or access functions contextually based on currently displayed menus in response to detecting particular movement of the device. For example, the electronic device may display a "Now Playing" display, navigate a cover flow display (e.g., display a next or different album cover), scroll through options, pan or scan to a radio station (e.g., move across preset radio stations when in a radio mode), or display a next media item (e.g., scroll through images in response to detecting a tilt motion) in response to detecting a particular movement of the device. In some embodiments, the electronic device may perform a particular operation independent of the current mode or menu of the electronic device. For example, a media player may always shuffle a playlist in response to detecting a particular movement of the device independent of the application or mode in use when the movement is detected (e.g., shuffle a playlist in a media playback mode, in a workout mode, and in a clock mode). In some embodiments, the user may select particular electronic device motions (e.g., from a known library) to associate different motions with different electronic device operations.

An electronic device, and in particular a portable electronic device, is inherently a device that will move as it is used. For example, a user may carry a portable media player as the user works out or runs, during which the media player will follow the user's movements. As another example, a user may carry a portable media player in a pocket or bag, which may cause the media player to move (e.g., as the user or bag moves). The motion sensor may be operative to detect all of these inherent or unintentional electronic device movements, as well as intentional movements by a user intending to cause the electronic device to perform an operation associated with a movement (e.g., the user shaking the device to shuffle a playlist). The electronic device must therefore have the capability of distinguishing between inherent movements of the electronic device (e.g., the device moves because the user is running with the device) and intentional movements associated with directing the electronic device to perform a particular operation.

Figure 2:
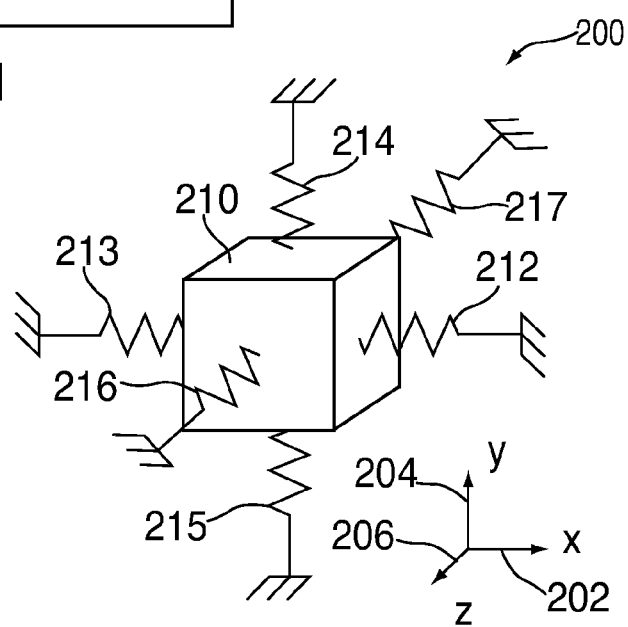
FIG. 2 is a schematic view of an illustrative accelerometer in accordance with one embodiment of the invention.

The electronic device may use any suitable approach or algorithm for distinguishing intentional movements of the device from false positives (e.g., movements of the device not to be associated with an electronic device operation). Although the following discussion will describe sensing motion in the context of a three axis accelerometer, it will be understood that the discussion may be applied to any suitable sensing mechanism or combination of sensing mechanisms. FIG. 2 is a schematic view of an illustrative accelerometer in accordance with one embodiment of the invention. Accelerometer 200 may include a micro electromechanical system (MEMS) having inertial mass 210, the deflections of which may be measured (e.g., using analog or digital circuitry). For example, mass 210 may be coupled to springs 212 and 213 along x-axis 202, springs 214 and 215 along y-axis 204, and springs 216 and 217 along z-axis 206. As mass 210 is displaced along any of axes 202, 204 and 206, the corresponding springs may deflect and provide signals associated with the deflection to the electronic device. The electronic device may identify deflection signals associated with spring tension, spring compression, or both. Accelerometer 200 may have any suitable rest value (e.g., no deflection on any axis), including for example in free fall (e.g., when the only force on the accelerometer and the device is gravity).

The electronic device may sample the accelerometer output (e.g., deflection values of mass 210) at any suitable rate. For example, the electronic device may sample accelerometer outputs in a range of 5 ms to 20 ms, such as 10 ms. The acceleration values detected by the accelerometer along each axis and output to the electronic device may be stored over a particular time period, and for example plotted over time. FIG. 3 is a schematic view of an illustrative graph of accelerometer output over time in accordance with one embodiment of the invention. Graph 300 may include time axis 302 and accelerometer value axis 304. The accelerometer value may be measured using any suitable approach, including for example as a voltage, force per time squared unit, or any other suitable unit. In some embodiments, the accelerometer may assign numerical values to the output based on the number of bits associated with the accelerometer for each axis. Graph 300 may include curve 312 depicting accelerometer measurements along the x-axis (e.g., x-axis 202, FIG. 2), curve 314 depicting accelerometer measurements along the y-axis (e.g., y-axis 204, FIG. 2), and curve 316 depicting accelerometer measurements along the z-axis (e.g., z-axis 206, FIG. 2).

Because a user may not always move an electronic device in the same manner (e.g., along the same axes), the electronic device may define, for each sampled time, an accelerometer value that is associated with one or more of the detected accelerometer values along each axis. For example, the electronic device may select the highest of the three accelerometer outputs for each sampled time. As another example, the electronic device may determine the magnitude of the detected acceleration along two or more axes. In particular, the electronic device may calculate the square root of the sum of the squares of the accelerometer outputs (e.g., square root of $x^2+y^2+z^2$). In some embodiments, the electronic device may ignore accelerometer outputs for a particular axis to reduce false positives (e.g., ignore accelerometer output along the z-axis to ignore the device rocking) when a condition is satisfied (e.g., all the time, or when the accelerometer output exceeds or fails to exceed a threshold). In some embodiments, the electronic device may use several approaches to define several acceleration values associated with different types of movement (e.g., an acceleration value associated with shaking, a different acceleration value associated with spinning, and still another acceleration value associated with tilting). The electronic device may then determine whether one or more of the defined acceleration values satisfy conditions for determining that the electronic device movement associated with the defined acceleration values was intended by the user.

The resulting magnitude of the accelerometer output may be stored by the electronic device, and for example plotted over time. FIG. 4 is a schematic view of an illustrative graph of the magnitude of the acceleration in accordance with one embodiment of the invention. Graph 400 may include time axis 402 and acceleration value axis 404. When substantially no acceleration is detected (e.g., when curve 410 is substantially flat), the magnitude of acceleration may be non-zero, as it may include acceleration due to gravity. This DC component in the magnitude of acceleration signal may prevent the electronic device from clearly detecting only movements of the electronic device. This may be particularly true if the value of the DC component is higher than the value of peaks in the magnitude of acceleration signal. In such a case, directly applying a simple low pass filter may conceal rather than reveal the acceleration signals reflecting movement of the electronic device.

To remove the effects of gravity (which may be constant) from the detected magnitude of acceleration signal, the electronic device may apply a high pass filter to the magnitude of acceleration signal. The resulting signal may not include a DC component (e.g., because the high pass filter may have zero gain at DC) and more precisely reflect actual movements of the electronic device. FIG. 5 is a schematic view of an illustrative graph of the magnitude of acceleration after eliminating the effect of gravity in accordance with one embodiment of the invention. Graph 500 may include time axis 502 and acceleration value axis 504. Curve 510 may be substantially centered around a zero value (e.g., no DC signal reflecting constant gravity) and include positive and negative peaks. The electronic device may rectify the signal of curve 510 to retain only positive acceleration values. For example, the electronic device may use a full wave rectifier (e.g., to take the modulus of curve 510). FIG. 6 is a schematic view of an illustrative graph of the rectified magnitude of acceleration after eliminating the effect of gravity in accordance with one embodiment of the invention. Graph 600 may include time axis 602 and acceleration value axis 604. Curve 610 may reflect the modulus of each value of curve 510 (FIG. 5), and thus be entirely above a zero acceleration value.

The electronic device may then apply a low pass filter to the rectified signal to provide a smoother signal that removes short term oscillations while retaining the longer term trend. For example, the electronic device may apply a low pass filter that computes a moving average for each sample point over any suitable sample size (e.g., a 32 point sample moving average). The resulting signal may be plotted, for example as curve 620. This signal may reflect how much the electronic device is moving (e.g., the value of each sample point indicates the amount by which the device is moving).

Figure 7:
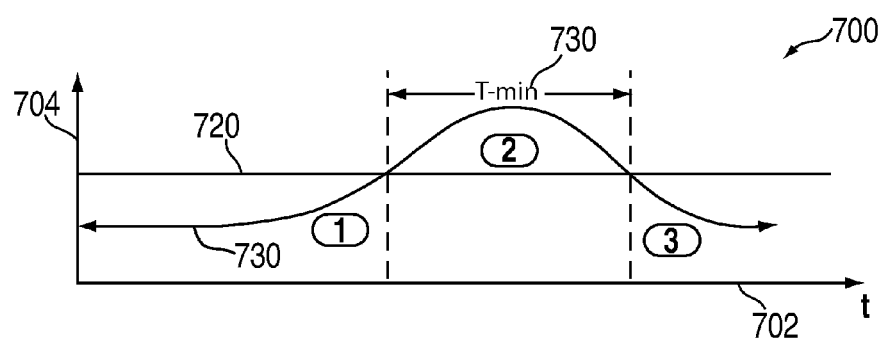
FIG. 7 is a schematic view of an illustrative graph depicting an accelerometer output exceeding a threshold in accordance with one embodiment of the invention.

Using the processed accelerometer signal, the electronic device may determine whether or not a detected movement of the device is an intentional movement to be associated with an electronic device operation or event. Any suitable approach may be used to distinguish intentional movements of the electronic device from unintentional movements. In some embodiments, the electronic device may define a threshold and determine whether the movement, as detected by the accelerometer, exceeds the defined threshold for at least a minimum duration. FIG. 7 is a schematic view of an illustrative graph depicting an accelerometer output exceeding a threshold in accordance with one embodiment of the invention. Graph 700 may include time axis 702 and acceleration value axis 704. Curve 710 may represent the processed accelerometer data (e.g., processed using the approach described above in connection with FIGS. 3-6).

Curve 710 may include several regions representing different detected amounts of movement. For example, curve 710 may include region 1 in which detected acceleration values are less than threshold 720 and increasing. Region 1 may represent, for example, the initial detection of a movement of the electronic device (e.g., as a user begins to shake the device). Once the acceleration exceeds threshold 720, curve 710 may enter region 2, which may represent the largest movement of the device. Curve 710 may then enter region 3, in which the detected acceleration decreases below threshold 720. Region 3 may represent the end of the movement of the electronic device (e.g., as the user stops moving the electronic device).

To prevent the electronic device from associating all detected movements (e.g., all acceleration values) with an electronic device operation (e.g., to reduce false positives), the electronic device may require a detected movement to exceed threshold 720. In other words, the acceleration signal may be required to enter region 2 before the electronic device performs an operation. To further reduce false positives, the electronic device may require the detected movement to exceed threshold 720 for a minimum time (e.g., minimum time 730). This may prevent the electronic device from performing an operation when a user accidentally drops or jolts the electronic device, which may cause a rapid entry into and exit from region 2. The minimum time may be selected to remove false positives while ensuring that a user is not required to move the electronic device for an excessive amount of time. In particular, the minimum time selected may account for the delay in the electronic device in processing the accelerometer signals and generating a signal that may be compared to the threshold (e.g., the processing delay may include approximately 320 ms due to the 32 samples taken at 10 ms intervals by a high pass filter). For example, the selected minimum time may be in the range of 500 ms to 1000 ms, such as 600 ms (to which 320 ms of processing delay may be added, thus requiring approximately 920s of motion by the user before the electronic device performs the requested operation).

While the use of a single threshold and minimum time may eliminate numerous false positives, the electronic device may still register acceleration values due to unintentional movements that satisfy the threshold and minimum time conditions. In particular, if a user is walking, running, or working out while carrying the electronic device (e.g., in a pocket or in an armband), the electronic device may move by amounts sufficient for the accelerometer output to exceed the threshold value for more than the minimum time. A more refined approach or rule may then be necessary to avoid associating unintentional detected movements with an electronic device operation.

Figure 8:
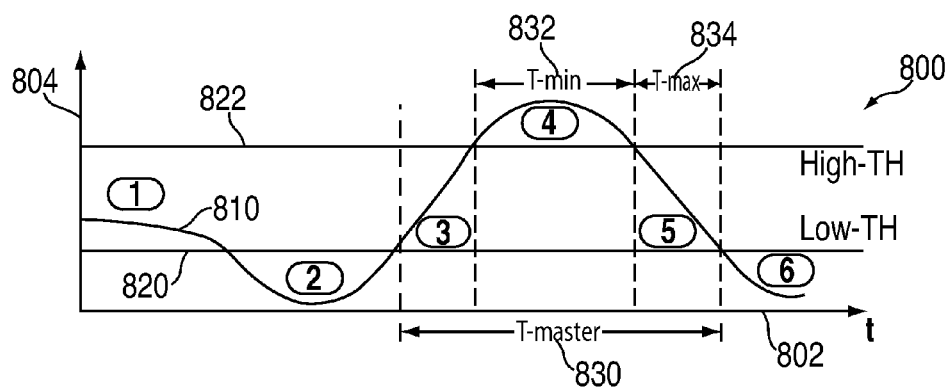
FIG. 8 is a schematic view of an illustrative graph depicting an accelerometer output associated with an intentional movement of an electronic device in accordance with one embodiment of the invention.

FIG. 8 is a schematic view of an illustrative graph depicting an accelerometer output associated with an intentional movement of an electronic device in accordance with one embodiment of the invention. Graph 800 may include time axis 802 and acceleration value axis 804. Curve 810 may represent the processed accelerometer data (e.g., processed using the approach described above in connection with FIGS. 3-6). Graph 800 may include several threshold values, including low threshold 820 and high threshold 822.

Curve 810 may include several regions representing different states of the electronic device. The electronic device may begin in state 1, in which the acceleration value is between the values of low threshold 820 and high threshold 822. Thresholds 820 and 822 may be defined such that acceleration values detected between thresholds 820 and 822 (e.g., acceleration values associated with state 1) are values typically detected during normal use of the electronic device. To provide a movement that the electronic device may detect as being intentional and associated with an electronic device operation, the electronic device may access state 2, in which the acceleration value is less than low threshold 820. Low threshold 820 may be defined such that a user must hold the electronic device relatively immobile or static before a subsequent higher acceleration value may be associated with an intentional movement of the electronic device. Requiring the electronic device to enter state 2 may reduce false positives due to a user moving the electronic device while performing an activity during which large acceleration values may be detected (e.g., running).

Once the user has caused the electronic device to enter state 2, the user may move the electronic device to provide an acceleration value sufficient to be detected as one to be associated with an electronic device operation. When the detected acceleration value increases and exceeds low threshold 822, the electronic device may enter state 3. As the electronic device enters state 3, a master timeout 830 may be started. If master timeout 830 times out before the electronic device reaches the acceleration values associated with state 6 (described below), the electronic device may return to state 1 and not perform an operation associated with the detected electronic device movement. The master timeout may be of any suitable length, including in the range of 1000 ms to 10000 ms, such as 2000 ms.

As the detected acceleration value increases, it may exceed high threshold 822, causing the electronic device to enter state 4. The electronic device may remain in state 4 until the detected acceleration value decreases below high threshold 822, at which time the electronic device may enter state 5. As the electronic device enters state 4, a timer may be started. If the detected acceleration value moves below high threshold 822 (e.g., the acceleration value associated with state 5) before the timer reaches a minimum value (e.g., minimum time 832), the electronic device may return to state 1 and not perform an operation associated with the detected electronic device movement (e.g., the detected acceleration was a single short accidental movement, such as dropping the electronic device). Minimum time 832 may be any suitable duration, including for example a duration in the range of 200 ms to 1000 ms, such as 500 ms.

As the electronic device enters state 5, another timer may be started. The electronic device may remain in state 5 until the acceleration value decreases below low threshold 820, at which time the electronic device may enter state 6. If the detected acceleration value moves below low threshold 820

(e.g., the acceleration value associated with state 6) after the timer exceeds a maximum value (e.g., maximum time 834), the electronic device may return to state 1 and not perform an operation associated with the detected electronic device movement (e.g., the detected acceleration is a lasting movement, such as running while carrying the electronic device). Maximum time 834 may be any suitable duration, including for example a duration in the range of 200 ms to 1000 ms, such as 500 ms. Once the electronic device enters state 6, the electronic device may perform the requested electronic device operation or event, and return to state 1.

In some embodiments, the values of low threshold 820 and high threshold 822 may be adjusted to refine the detection of intentional movements by the electronic device. For example, a user may select particular values for one or both of the low and high thresholds (e.g., to define the sensitivity of the device). In one implementation, a user may set the threshold values by dragging a displayed slider or providing an input (e.g., a numerical value). In another implementation, a user may select an appropriate pre-set threshold value for one or both of the low and high thresholds (e.g., select an option for low sensitivity, normal sensitivity, or high sensitivity). In some embodiments, the electronic device may automatically adjust threshold values based on a user's history of inputs (e.g., the user undid the effect of an operation, or instructed the electronic device to perform an operation after an intentional electronic device movement was not detected). In some embodiments, the low and high thresholds may be related, for example non-linearly or linearly. For example, the high threshold value may be 2.5 times the low threshold value (e.g., low threshold equals 0.4 times high threshold).

In some embodiments, several sets of low and high threshold values may be defined and associated with different electronic device operations or events. For example, different threshold values may be associated with different types of acceleration values (e.g., defined using different portions of the motion sensor output or applying different algorithms or processes to the motion sensor output), such that different threshold values may be associated with different motions of the electronic device (e.g., different threshold values for shaking, tilting and spinning). The threshold values may have different relations based on the underlying acceleration value used or operation to perform, including for example any suitable non-linear or linear relation. In some embodiment, the user or the electronic device may define high thresholds, low thresholds, or both for different types of acceleration values, electronic device operations or generated events.

In some embodiments, one or more of the values of the master timeout, minimum time and maximum time may instead or in addition be adjusted to refine the detection of intentional movements by the electronic device. For example, a user may select particular values for one or more of the timeout and times (e.g., using a slider, providing an input, or selecting a preset value). As another example, the electronic device may automatically adjust threshold values based on a user's history of inputs. In some embodiments, the low and high thresholds may be related or constrained relative each other (e.g., the minimum time cannot exceed the master timeout).

If the electronic device identifies several types of motions to detect for performing different electronic device operations, the electronic device may sequentially or simultaneously generate different acceleration values (e.g., using different processes) and apply different rules to the acceleration values to determine whether a detected motion sensor output is associated with at least one of the several identified intentional motions. In some embodiments, the electronic device may prioritize the processing of acceleration values or application of different rules to determine which operation to perform in response to a detected motion (e.g., define a priority scheme).

In some embodiments, the electronic device may automatically define one or more of an acceleration value calculating process, threshold values, and timeout values for particular electronic device motions. For example, the electronic device may allow a user to define a particular motion by moving the device in the particular manner. In response to detecting the motion once or several times, the electronic device may process the motion sensor output to define acceleration value process, thresholds, and timeouts that reflect the user's motion. The user may further be directed to move the electronic device in manners other than the particular motion to ensure that other motions are not detected as false positives and to refine the definition of the motion. The user may then associated the newly defined motion with any suitable electronic device operation or event generation.

Figure 9:
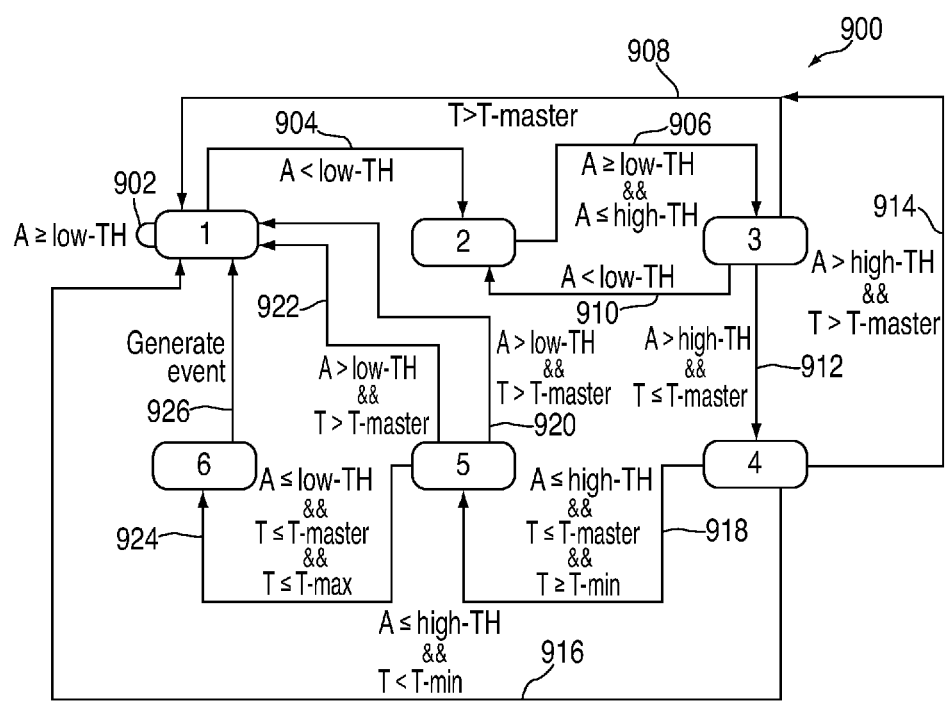
FIG. 9 is a schematic state diagram of illustrative states of an electronic device detecting an acceleration value in accordance with one embodiment of the invention.

FIG. 9 is a schematic state diagram of illustrative states of an electronic device detecting an acceleration value in accordance with one embodiment of the invention. Although some of the edges in the following state diagram are associated with particular variables being equal to particular values, it will be understood that any appropriate edge may or may not be associated with particular variables being equal to particular values (e.g., in addition to particular variables being greater or smaller than particular values).

State diagram 900 may include state 1, from which the electronic device may begin. The detected acceleration value A by the electronic device (e.g., the resulting value following processing of the accelerometer outputs) may be greater than or equal to a low threshold low-TH (e.g., low threshold 820, FIG. 8). So long as the detected acceleration value remains greater than or equal to the low threshold, the electronic device may follow edge 902 and remain in state 1.

When the electronic device determines that the detected acceleration value is smaller than the low threshold, the electronic device may follow edge 904 and move to state 2.The electronic device may remain in state 2 so long as the detected acceleration value remains smaller than the low threshold. When the detected acceleration value is greater than or equal to the low threshold, and lower than or equal to a high threshold high TH (e.g., high threshold 822, FIG. 8), the electronic device may follow edge 906 and move to state 3. The electronic device may start a master timer when it enters state 3 (e.g., the electronic device may time out at master timeout value T-master). If the electronic device determines that it is still in state 3 (e.g., the detected acceleration value remains in the range between the low and high thresholds) and that the master timer exceeds the master timeout value, the electronic device may follow edge 908 and return to state 1.

Alternatively, if the electronic device determines that the detected acceleration value has decreased and is less than the low threshold, the electronic device may follow edge 910 and return to state 2. When the electronic returns to state 2, the master timer may be reset to await a subsequent return to state 3. Still alternatively, if the electronic device determines that the detected acceleration value exceeds the high threshold and the master timer is less than or equal to the master timeout value, the electronic device may follow edge 912 to state 4. The master timer started at state 3 may continue to run while the electronic device moves to state 4.

If the electronic device determines that it is still in state 4 (e.g., the detected acceleration value greater than the high threshold) and that the master timer exceeds the master timeout value, the electronic device may follow edge 914 and return to state 1.

In addition to the ongoing master timer, the electronic device may initiate a minimum timer when it enters state 4 (e.g., the electronic device may time in at minimum timer value T-min). The minimum timer may ensure that the electronic device remains in state 4 for a sufficient period before moving to the next state. If the electronic device determines that the detected acceleration value is less than or equal to the high threshold (e.g., the detected acceleration value is no longer associated with state 4), and that the minimum timer is less than the minimum timer value, the electronic device may follow edge 916 and return to state 1.

Alternatively, if the electronic device determines that the detected acceleration value is less than or equal to the high threshold, and the master timer is less than or equal to the master timer value, and the minimum timer is greater than or equal to the minimum timer value, the electronic device may follow edge 918 and move to state 5. The master timer started at state 3 may continue to run while the electronic device moves to state 5. If the electronic device determines that it is still in state 5 (e.g., the detected acceleration value greater than the low threshold) and that the master timer exceeds the master timeout value, the electronic device may follow edge 920 and return to state 1.

In addition to the ongoing master timer, the electronic device may initiate a maximum timer when it enters state 5 (e.g., the electronic device may time out at maximum timer value T-max). The maximum timer may ensure that the electronic device does not remain state 5 for an excessive amount of time (e.g., the user of the electronic device intentionally moved the device then stopped moving the device) before moving to the next state. If the electronic device determines that the detected acceleration value is greater than the low threshold (e.g., the detected acceleration value is still associated with state 5), and that the maximum timer is greater than the maximum timer value, the electronic device may follow edge 922 and return to state 1.

Alternatively, if the electronic device determines that the detected acceleration value is less than or equal to the low threshold, and the master timer is less than the master timer value, and the maximum timer is less than or equal to the maximum timer value, the electronic device may follow edge 924 and move to state 6. At state 6, the electronic device may generate an event or perform an operation associated with the detected acceleration of the electronic device. In some embodiments, the electronic device may provide feedback to indicate to the user that the event was generated or the operation was performed. For example, the electronic device may provide an audio cue to indicate that a playlist was reshuffled, or a visual transition to indicate that a new radio station or playlist was selected.

In some embodiments, the monitoring of the motion sensor output and processing of the output to generate a motion sensor value may consume significant power. In particular, if the electronic device is portable and relies on an internal battery, reducing power consumption may be desirable. The electronic device may cease monitoring or turn off the motion sensor automatically or in response to a user instruction. For example, a user may toggle a switch to turn off the feature of providing instructions by moving the electronic device. In some embodiments, the electronic device may automatically turn off the motion sensor based on the context of the electronic device. For example, if a user activates a hold switch to prevent an input mechanism from receiving inputs, the electronic device may turn off the motion sensor (e.g., as the user has indicated that inputs will not be provided). As another example, if an electronic device enters a sleep or lock mode or darkens a display while providing an audio output, the electronic device may turn off the motion sensor (e.g., no inputs are received until the user provides a physical input using an input mechanism to exit the sleep or lock mode or reactivate the display).

Thus it is seen that systems and methods for processing signals generated by an accelerometer and generating corresponding events have been provided. It will be understood that the foregoing is only illustrative of the principles of the invention, and that various modifications can be made by those skilled in the art without departing from the scope and spirit of the invention, and the present invention is limited only by the claims that follow.

What is claimed is:

1. A method for detecting an intentional movement of an electronic device based on a motion sensor output, comprising:
   identifying the output of the motion sensor;
   processing the output to generate a motion value;
   tracking variations of the motion value over time; and
   determining, in response to tracking, that the motion value sequentially changes from being in a first state relative to first and second thresholds to being in a second state relative to the first and second thresholds, and then from being in the second state to being in a third state relative to the first and second thresholds, wherein:
   the first threshold is different than the second threshold; and
   the first state is different than the second state.

2. The method of claim 1, wherein determining further comprises determining before a master timeout lapses.

3. The method of claim 2, wherein the master timeout begins when the motion value changes from being in the first state to being in the second state.

4. The method of claim 3, wherein determining further comprises determining that the motion value remains in the second state for at least a minimum time.

5. The method of claim 4, wherein determining further comprises determining that the motion value changes from being in the second state to being in the third state within a maximum time.

6. The method of claim 5, wherein:
   the first state is one of greater than both the first threshold and the second threshold and less than both the first threshold and the second threshold;
   the second state is between the first threshold and the second threshold; and
   the third state is the other one of greater than both the first threshold and the second threshold and less than both the first threshold and the second threshold.

7. The method of claim 1, wherein determining further comprises determining that the motion value remains in the second state for at least a minimum time.

8. The method of claim 7, wherein:
   the first state is one of greater than both the first threshold and the second threshold and less than both the first threshold and the second threshold;
   the second state is between the first threshold and the second threshold; and
   the third state is the same as the first state.

9. The method of claim 1, further comprising performing an electronic device operation in response to determining.

10. The method of claim 1, wherein:
the first state is one of greater than both the first threshold and the second threshold and less than both the first threshold and the second threshold;
the second state is between the first threshold and the second threshold; and
the third state is the same as the first state.

11. The method of claim 1, wherein:
the first state is one of greater than both the first threshold and the second threshold and less than both the first threshold and the second threshold;
the second state is between the first threshold and the second threshold; and
the third state is the other one of greater than both the first threshold and the second threshold and less than both the first threshold and the second threshold.

12. The method of claim 11, wherein:
the first state is one of greater than both the first threshold and the second threshold and less than both the first threshold and the second threshold;
the second state is between the first threshold and the second threshold; and
the third state is the other one of greater than both the first threshold and the second threshold and less than both the first threshold and the second threshold.

13. The method of claim 1, wherein:
determining comprises determining, in response to tracking, that the motion value sequentially changes from being in the first state to being in the second state, and then from being in the second state to being in the third state, and then from being in the third state to being in the second state, and then from being in the second state to being in the first state;
the first threshold is different than the second threshold;
the first state is different than the second state;
the second state is different than the third state; and
the third state is different than the first state.

14. The method of claim 13, wherein determining further comprises determining before a master timeout lapses.

15. The method of claim 14, wherein the master timeout begins when the motion value changes from being in the first state to being in the second state.

16. The method of claim 15, wherein determining further comprises determining that the motion value remains in the third state for at least a minimum time.

17. The method of claim 16, wherein determining further comprises determining that the motion value changes from being in the second state to being in the first state within a maximum time.

18. The method of claim 17, further comprising performing an electronic device operation in response to determining, wherein:
the first state is one of greater than both the first threshold and the second threshold and less than both the first threshold and the second threshold;
the second state is between the first threshold and the second threshold; and
the third state is the other one of greater than both the first threshold and the second threshold and less than both the first threshold and the second threshold.

19. An electronic device comprising:
a motion sensor operative to provide an output related to motion of the electronic device; and
a processor configured to:
process the output to generate a motion value; and
determine that the motion value satisfies a rule associated with intentional movements of the electronic device, wherein:
the rule requires that the motion value changes from being in a first state relative to first and second thresholds to being in a second state relative to the first and second thresholds, and then changes from being in the second state to being in a third state relative to the first and second thresholds;
the first threshold is different than the second threshold; and
the first state is different than the second state.

20. The electronic device of claim 19, wherein the rule further requires that the motion value changes from being in the first state to being in the second state and then from being in the second state to being in the third state before the lapse of a master timeout that begins when the motion value changes from being in the first state.

21. The electronic device of claim 19, wherein the rule further requires that the motion value remains in the second state for at least a minimum time.

22. The electronic device of claim 19, wherein the rule further requires that the motion value changes from being in the second state to being in the third state within a maximum time.

23. The electronic device of claim 19, wherein:
the first state is one of greater than both the first threshold and the second threshold and less than both the first threshold and the second threshold;
the second state is between the first threshold and the second threshold; and
the third state is the same as the first state.

24. The electronic device of claim 19, wherein:
the first state is one of greater than both the first threshold and the second threshold and less than both the first threshold and the second threshold;
the second state is between the first threshold and the second threshold; and
the third state is the other one of greater than both the first threshold and the second threshold and less than both the first threshold and the second threshold.

25. A non-transitory computer-readable medium for detecting an intentional movement of an electronic device based on a motion sensor output, comprising computer-program logic recorded thereon for:
identifying the output of the motion sensor;
processing the output to generate a motion value;
tracking variations of the motion value over time; and
determining, in response to tracking, that the motion value sequentially changes from being in a first state relative to first and second thresholds to being in a second state relative to the first and second thresholds, and then from being in the second state to being in a third state relative to the first and second thresholds, wherein:
the first threshold is different than the second threshold; and
the first state is different than the second state.

26. The non-transitory computer-readable medium of claim 25, wherein:
the first state is one of greater than both the first threshold and the second threshold and less than both the first threshold and the second threshold;
the second state is between the first threshold and the second threshold; and
the third state is the same as the first state.

27. The non-transitory computer-readable medium of claim 25, wherein:
 the first state is one of greater than both the first threshold and the second threshold and less than both the first threshold and the second threshold;
 the second state is between the first threshold and the second threshold; and
 the third state is the other one of greater than both the first threshold and the second threshold and less than both the first threshold and the second threshold.

* * * * *